United States Patent
Pathier

(10) Patent No.: US 12,442,688 B2
(45) Date of Patent: Oct. 14, 2025

(54) METHOD FOR IN-LINE MEASUREMENT OF THE TEMPERATURE OF PRODUCTS TRAVELLING ON A CONVEYOR IN A FOOD PROCESSING OPERATION

(71) Applicant: L'Air Liquide, Societe Anonyme pour l'Etude et l'Exploitation des Procedes Georges Claude, Paris (FR)

(72) Inventor: Didier Pathier, Les Loges-en-Josas (FR)

(73) Assignee: L'Air Liquide, Société ANonyme pour l'Etude et l'Exploitation des Procédés Georges Claude, Paris (FR)

( * ) Notice: Subject to any disclaimer, the term of this patent is extended or adjusted under 35 U.S.C. 154(b) by 430 days.

(21) Appl. No.: 17/793,903

(22) PCT Filed: Jan. 4, 2021

(86) PCT No.: PCT/EP2021/050014
§ 371 (c)(1),
(2) Date: Jul. 19, 2022

(87) PCT Pub. No.: WO2021/148245
PCT Pub. Date: Jul. 29, 2021

(65) Prior Publication Data
US 2023/0048626 A1    Feb. 16, 2023

(30) Foreign Application Priority Data
Jan. 20, 2020 (FR) .................................. 2000512

(51) Int. Cl.
*G01J 5/00* (2022.01)
*A23B 2/80* (2025.01)
(Continued)

(52) U.S. Cl.
CPC ............ *G01J 5/0022* (2013.01); *A23B 2/803* (2025.01); *A23B 2/88* (2025.01); *F25D 3/11* (2013.01);
(Continued)

(58) Field of Classification Search
CPC ........ G01J 5/0022; G01J 5/026; G01J 5/0275; G01J 15/02; A23B 2/803; A23B 2/88;
(Continued)

(56) References Cited

U.S. PATENT DOCUMENTS

2010/0008396 A1    1/2010   Gaskins et al.
2011/0265492 A1   11/2011   Newman et al.
(Continued)

FOREIGN PATENT DOCUMENTS

FR    2 860 068      3/2005
JP    2003 297528   10/2003
JP    2016 078327    5/2016

OTHER PUBLICATIONS

International Search Report and Written Report for PCT/EP2021/050014, mailed Feb. 2, 2021.
(Continued)

*Primary Examiner* — Lisa M Caputo
*Assistant Examiner* — Christian T Bryant
(74) *Attorney, Agent, or Firm* — Yan Jiang; Christopher J. Cronin

(57) ABSTRACT

Method for determining the temperature of products transported on the conveyor belt of a cryogenic tunnel, comprising the following steps: —continuously measuring the surface temperature of products travelling on the conveyor belt; —measuring the thickness of a product at the point where the temperature measurement is taken; —performing the following evaluation: a. when the thickness of the product is within a certain range, then the temperature measured for
(Continued)

said product is considered to be a reliable value; b. when the thickness of the product is outside the range, then the last temperature value of the measured product is considered to be a reliable value according to paragraph a) above; c. after a determined period of time during which the measured thickness is outside the range, it is concluded that there are no products on the conveyor belt and the temperature measurements are no longer taken into account.

2 Claims, 1 Drawing Sheet

(51) Int. Cl.
*A23B 2/88* (2025.01)
*F25D 3/11* (2006.01)
*G01B 15/02* (2006.01)
*G01J 5/02* (2022.01)
*G01K 13/06* (2006.01)

(52) U.S. Cl.
CPC .......... *G01B 15/02* (2013.01); *A23V 2002/00* (2013.01); *F25D 2700/06* (2013.01); *F25D 2700/16* (2013.01); *G01J 5/026* (2013.01); *G01J 5/0275* (2013.01); *G01K 13/06* (2013.01); *G01K 2203/00* (2013.01)

(58) Field of Classification Search
CPC ..... A23B 2/8033; F25D 3/11; F25D 2700/06; F25D 2700/16; A23V 2002/00; G01K 13/06; G01K 2203/00; G01B 15/02; A23L 3/361; A23L 3/375; A23L 3/362
See application file for complete search history.

(56) References Cited

U.S. PATENT DOCUMENTS

| | | | |
|---|---|---|---|
| 2015/0092810 A1 | 4/2015 | Crompton et al. | |
| 2016/0286845 A1* | 10/2016 | Hocker | G01K 1/026 |
| 2017/0138661 A1 | 5/2017 | Newman et al. | |
| 2018/0346225 A1* | 12/2018 | Winkle | B64D 5/00 |
| 2021/0040575 A1* | 2/2021 | Ferry | F22B 37/102 |

OTHER PUBLICATIONS

French Search Report and Written Opinion for FR 2 000 512, mailed Sep. 24, 2020.

* cited by examiner

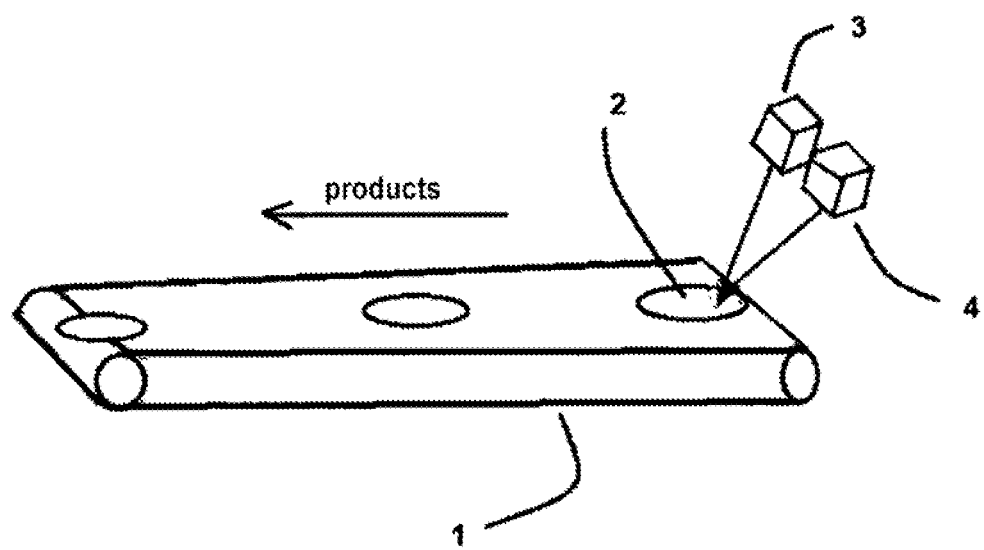

METHOD FOR IN-LINE MEASUREMENT OF THE TEMPERATURE OF PRODUCTS TRAVELLING ON A CONVEYOR IN A FOOD PROCESSING OPERATION

CROSS-REFERENCE TO RELATED APPLICATIONS

This application is a § 371 of International PCT Application PCT/EP2021/050014, filed Jan. 4, 2021, which claims § 119(a) foreign priority to French patent application FR 2000512, filed Jan. 20, 2020.

BACKGROUND

Field of the Invention

The present invention relates to the field of the food industry, and is particularly concerned with methods for measuring the temperature of products circulating on a conveyor in a food processing operation, in particular in deep-freezing operations.

Related Art

On a food production line, it is often crucial to know the temperature of the processed products:
  thus in a cooking operation it is important to know the temperature reached by the products in order to be able to stop the cooking when the product is considered to be cooked enough;
  while in the case of cooling or freezing processes, it is also important to know the temperature reached by the products in order to adjust the operating parameters, for example to avoid insufficiently frozen products, but also obtaining products that are too cold which would lead to unnecessarily high energy consumption.

This industry is familiar with the practice of taking, virtually randomly, a sample of product from the line and manually measuring the temperature of this product.

This practice works of course, but it is not a continuous measurement, and it is expensive since it assumes the assignment of a person who devotes part of his time to this task.

Furthermore, it is known in this industry to use a pyrometer to measure the surface temperature, continuously, of products circulating on a conveyor. This method provides a useful and advantageous response in the field. Indeed, it has very often been observed that this measurement of the surface temperature is an excellent indication of the average temperature of the product, the temperature that interests us in the first place. In addition, by carrying out the measurement continuously, the production line operator is informed at all times of the proper conduct of his process; he can even program alarms which will alert him of drifts in real time. On the other hand, it must be kept in mind that the empty portions of the conveyor, without product, will give a temperature measurement which can falsify the whole evaluation. A simple measurement of the surface temperature of the products passing on a conveyor by means of a pyrometer is therefore not sufficient. Too many false measurements (conveyor temperature measurements) cause this measurement to lose all value.

It is therefore quite clear that it would be extremely advantageous for this technical field to be able to have a method for measuring the temperature of the treated products, in-line and at low cost. This measurement must be carried out continuously and must not be polluted by the temperature of the conveyor or by any other interference.

SUMMARY OF THE INVENTION

As will be seen in more detail in the following, the present invention proposes an in-line measurement method which implements the following features:
  a temperature measurement system, for example a pyrometer, fixed in space in a position close to (above or to the side of) the conveyor, is implemented in order to carry out a continuous measurement of the surface temperature of the products moving along. In many applications, non-contact temperature measurement systems such as the pyrometer or any other non-contact temperature measurement system will be preferred. However, when contact with the product moving on the conveyor is possible, there may also be used contact thermometers which will rub on the upper surface of the products. In this case, there may be chosen systems using Pt100, Pt1000 technologies, other resistance probes, thermocouples of all types and fiber optics. In the case where a pyrometer is used, it therefore provides, and without distinction, a reading of the surface temperatures of the conveyor belt and of the products present on this conveyor belt, the measurement being made at a fixed point opposite the pyrometer.
  Also implemented is a distance measurement with a laser (a laser or another distance measurement system based on another principle such as ultrasound, visible light, or even a physical sensor), which measures the thickness of the product at the very place where the temperature measurement is carried out by the pyrometer (or other system);
  a computer then performs the following evaluation:
  when the thickness of the product is between a lower limit and an upper limit, the system then considers that the temperature measured by the pyrometer is a reliable value of the temperature of the product;
  when the thickness of the product is greater than the upper limit (passage of a foreign body in the measurement field), or even below the lower limit (empty conveyor, without products), then the system takes into account and stores in memory the last product temperature value measured by the pyrometer (and which had been considered by the system as a reliable value according to the paragraph above) and this value is then considered provisionally as a good indication of the temperature of the product whose measured thickness is outside the range of limits. After a determined period of time (typically a few seconds to a few minutes), during which the measured thickness is outside the said range, the system concludes that there are no products on the conveyor, and no longer takes into account the temperature measurements provided by the pyrometer (or other system), measurements considered as "default" values. This default value is determined by the user. This value should not lead to confusion with the temperatures actually measured and it is typically fixed outside the expected measurement range. Thus, in the case of a measurement of the temperature of frozen products whose temperature typically varies between −15 and −25° C., this default value is fixed for example at +100° C. When the system indicates +100° C., it will be obvious to the user that the measured temperature is not +100° C. and it is the case of an absence of product.

it is also possible advantageously to add another calculation making it possible to further refine the measurement. It is thus possible to add a calculation producing a sliding average of the presence of product on the conveyor.

It is an average calculated for example over 1 or 10 minutes. The values considered are 0 and 1. With 0s and 1s there can be made an average.

For example, 2 minutes are observed with products (1) and 8 minutes without products (0), which will give a sliding average of 0.2.

The average can be calculated in several ways, thus by way of illustration for an average over 10 minutes and 1 calculation per second:
- the measurements are added once per second for 10 minutes and one divides by 600
- the following calculation is done once per second:

new average=(600−1)/600×(previous average)+measurement/600

Thus, as understood on reading the foregoing, when the thickness measurement is lower than the lower limit or higher than the upper limit, the value 0 is considered in the calculation of the average. When the thickness measurement is between the lower limit and the upper limit, the value 1 is considered in the calculation of the average. With this average being calculated continuously, a lower limit is defined for this average (Average Min). When this average is higher than the Average Min, then the calculations explained in the section above remain unchanged. When the average is less than Average Min, then the temperature read by the pyrometer is not taken into account. The system then takes into account and stores in memory the last product temperature value measured by the pyrometer.

according to another embodiment of the invention, a temperature smoothing calculation can be added. Temperature smoothing is in fact a sliding average which can be calculated in several ways. By way of illustration for smoothing over 3 minutes and 2 calculations per second:

the measurements are added twice per second for 3 minutes and one divides by 360 the following calculation is made twice per second: new average=(360−1)/360×(previous average)+measurement/360.

The smoothing coefficient can be higher or lower depending on the reactivity and the measurement stability sought. The smoothing calculation will be interrupted when the measured value is equal to the default temperature and when the product thickness is less than the minimum thickness or greater than the maximum thickness.

BRIEF DESCRIPTION OF THE FIGURES

FIG. 1 attached makes it possible to better visualize an installation making it possible to implement the invention, where there can be seen products 2 circulating on a conveyor 1, with the presence of a pyrometer 3 and a laser 4.

DETAILED DESCRIPTION OF THE INVENTION

The experiments carried out by the Applicant under the conditions of the invention show the following points:
- the temperatures measured according to the invention are more reliable than a simple and conventional measurement made by pyrometer alone;
- the invention also provides additional information with information on whether or not a product is present on the conveyor;
- the system used is certainly more expensive than a simple pyrometer, but the quality and reliability of the ("filtered") information obtained is incomparable.

The invention therefore relates to a method for determining the temperature of products transported on the conveyor belt of a cryogenic tunnel, characterized by the implementation of the following measures:

A temperature measurement system, for example a pyrometer, fixed in space in a position close to, above or to the side of the conveyor, is implemented which performs a continuous measurement of the surface temperature of products moving along opposite the temperature measurement system.

A distance measurement system such as a laser or an ultrasound system is implemented to measure the thickness of a product, the temperature of which was measured during the previous step.

there is provided a computer which then performs the following evaluation:
- when the thickness of the product is between a lower limit and an upper limit, it is then considered that the temperature measured for this product by the temperature measurement system is a reliable value of the temperature of the product;
- when the thickness of the product is greater than the upper limit or well below the lower limit, then the computer takes into account and stores in memory the last product temperature value measured by the system and considered by the computer as a reliable value according to the paragraph above, and this value is then considered as a good indication of the temperature of the product whose measured thickness is outside the range of limits;
- after a determined period of time, during which the measured thickness is outside said range, the computer concludes that there are no products on the conveyor, and no longer takes into account the temperature measurements provided by the temperature measurement, measurements considered as "default" values.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for determining a temperature of products transported on a conveyor belt of a cryogenic tunnel, comprising the steps of:
    (a) carrying out a continuous measurement of a surface temperature of products moving along the conveyor belt opposite a temperature measurement system, the temperature measurement system being a pyrometer and being fixed in space in a position close to, above, or to the side of, the conveyor;
    (b) measuring a thickness of one of the products, whose temperature was measured during said step (a), with a distance measurement system, the distance measurement system being a laser or an ultrasound system; and
    (c) using a computer to continuously calculate a sliding average of a presence of the products on the conveyor belt, wherein:
    when the measured thickness is outside the range of thickness for a predetermined period of time, a value 0 is considered in the calculation of the sliding average;
    when the measured thickness is within the range of thickness for a predetermined period of time, a value 1 is considered in the calculation of the sliding average; and
    a lower limit for the sliding average is defined for the sliding average, and when an actual sliding average is lower than a defined lower limit for the sliding average, the temperature measured by the temperature measurement system is not recorded and the computer then records and stores, in memory, the last product temperature value measured by the temperature measurement system.

2. The method of claim 1, wherein a temperature smoothing calculation is carried out during the continuous measurement of surface temperature.

* * * * *